July 13, 1937.  F. KREIS  2,086,809
UNIVERSAL GEAR
Filed Feb. 4, 1935  3 Sheets-Sheet 1
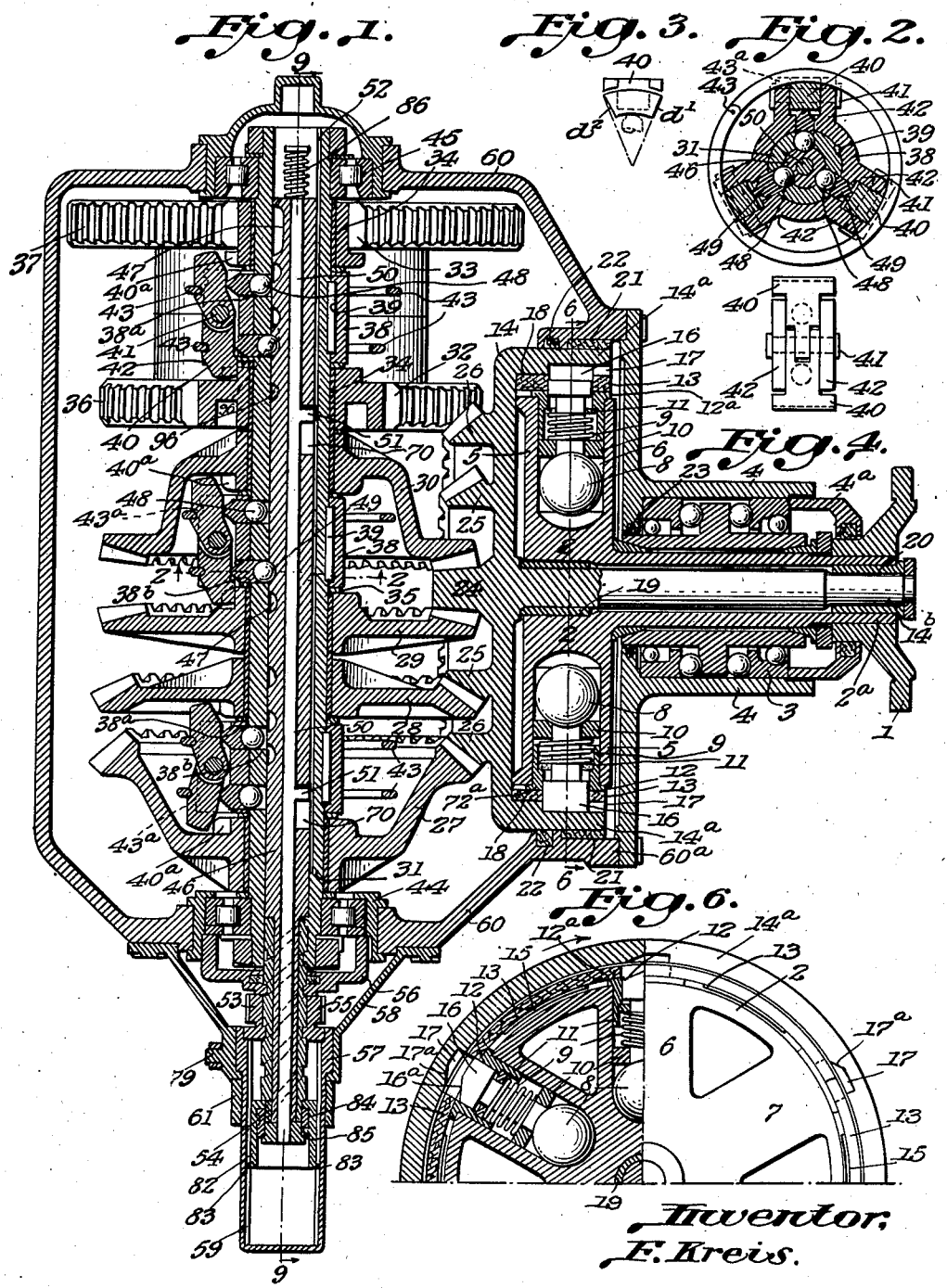
Inventor,
F. Kreis.
By Glascock Downing & Seebold
Attys.

July 13, 1937.   F. KREIS   2,086,809
UNIVERSAL GEAR
Filed Feb. 4, 1935   3 Sheets-Sheet 2

GEAR STEPS
V GEAR = SUPER SPEED
MOTOR REVOLUTIONS $n$ = 2000 P.M.

Inventor,
F. Kreis.
By Glascock Downing & Seebold
Attys.

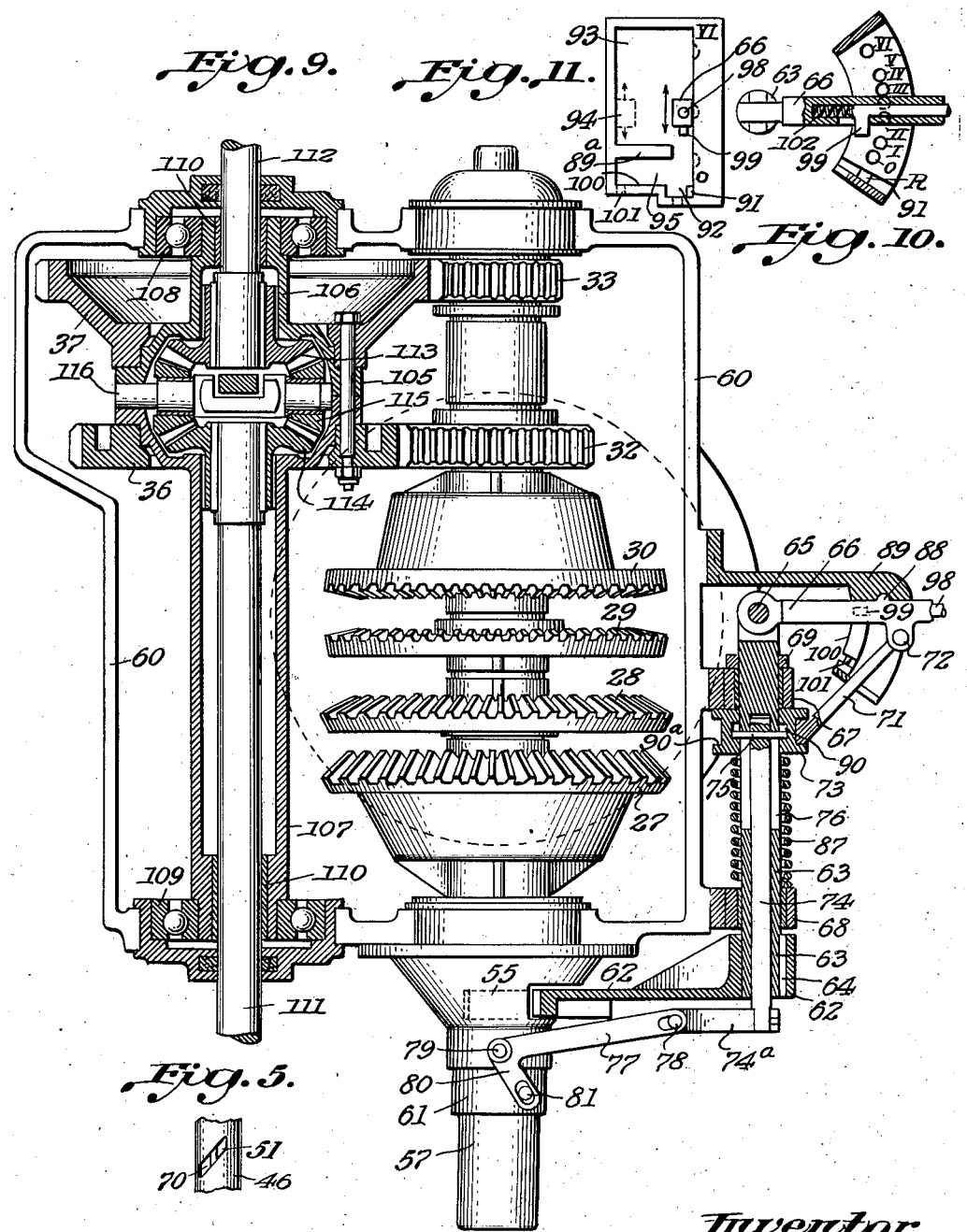

Patented July 13, 1937

2,086,809

UNITED STATES PATENT OFFICE 2,086,809

UNIVERSAL GEAR

Fritz Kreis, Nuremberg, Germany

Application February 4, 1935, Serial No. 4,925
In Germany October 7, 1933

4 Claims. (Cl. 74—362)

In motor vehicles with the hitherto known change speed and differential gears which are mounted and used separately the step down transmission to the driving wheels was never a progressive one, that is to say, the different speeds were never only geared down but both geared down and up. In a three-speed gear for instance, in which the third speed is coupled directly to the speed of revolution of the engine, the second speed was always first geared down to a lay shaft and geared up again to the gear shaft. The downward gear to the lay shaft was required for the first speed. In the case of a 4-speed or 5-speed gear even two or three gears would run with a poor efficiency. Even the newly introduced super-speed shows a very poor efficiency. With this speed the speed of revolution is taken even beyond that of the engine and at the differential gear in the rear axle the high speed of revolution is again greatly reduced. Since the driving rod wheels of a vehicle normally never reach the speed of revolution of the engine, that transmission arrangement will have the best efficiency, where there always is a progressive step down. The construction of such a transmission gear is the object of the present invention. A further object of the invention is the arrangement of the gear wheels in such a way, that a great range of step down ratios is provided with a minimum of gear wheels.

The invention is illustrated in the accompanying drawings, wherein

Figure 1 is a cross section through the entire gear.

Figure 2 is a section through one of the change speed clutches on line 2—2 of Figure 1.

Figure 3 is a front view of a dog according to Fig. 2.

Figure 4 is a view from above of the mounting of two dogs according to Figure 2.

Figure 5 shows one of the two dog guides on the control shaft. Fig. 5a is a view at right angles to Figure 5.

Figure 6 shows the semi-automatic clutch with free wheel arrangement, one-quarter being in section and one-quarter a view on line 6—6 of Figure 1.

Fig. 9 is a longitudinal section on line 9—9 of Figure 1, the upper gear shaft being shown in elevation.

Figure 10 is a view partly in section, at right angles to the gear lever shown in Figure 8.

Figure 11 is a plan view of the gate for the gear lever.

Figure 8:
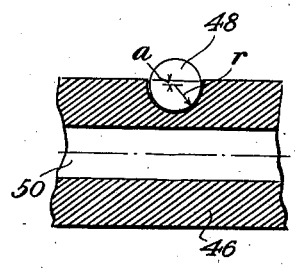
Figure 8 is a longitudinal section through a portion of the control shaft.

The housing 60 of the transmission has attached to an opening 60a in its front wall a cover plate provided with a neck 4 which encloses a set of ball bearings 3. In the bearings 3 the shaft 2a of a wheel body 2 is journalled. The free end of the shaft 2a extends through a cover 4a beyond the neck 4 and has a flange 1 rigidly connected, which serves to transmit the power of the engine to the shaft 2a and thereby also to the wheel body 2. The wheel body 2 is a wheel having a number of radial spokes 5, for instance six spokes with open bores 6. At the bottom of the bore of each spoke 5 a ball 8 is situated, adapted to slide within the bore 6 of the spoke under the influence of centrifugal force when rotating together with the wheel body 2. Outward movement of the balls 8 is resisted and acccurately adjusted by compression springs 9 arranged in the bores 6 of the spokes 5 above the balls 8. Rings 10 are interposed between the inner ends of the springs 9 and the balls 8. The outer ends of the springs 9 engage with rings 11 bearing against inwardly projecting flanges of sleeves 12, which are slidably mounted in the bores 6 near the periphery of the wheel body 2. The sleeves 12 possess flanges 12a projecting at their outer ends and lying between the outer circumference of the wheel body 2 and the inner face of a clutch lining 13 enclosing the wheel body 2. The lining 13 is divided up over the whole of the periphery into six segments, each segment contacting at each end with a flange 12a of the sleeves 12. The outer faces of the segments of the lining 13 are separated by a small clearance from the inside of a surrounding drum wall 14a of a driving gear wheel 14, which is freely rotatable with its shaft 14b in bushes 19 and 20 of the shaft 2a and on a ring 18 of the wheel body 2. On the outer periphery of the drum wall 14a a packing ring 21 is attached within the opening 60a of the casing 60, while a sealing ring 22 near the inner end of the opening 60a encloses the drum wall 14a. A sealing ring 23 is provided in the opening of the cover plate which encloses the inner race of the bearing 3 on the shaft 2a of the wheel body 2.

In each spoke 5 of the wheel body 2 the compression spring 9 surrounds a stem 15 of a locking member 16, which is loosely guided by the ring 11 but rigidly connected at the inner end to the ring 10. The locking member 16 adjoining the outer end of the stem 15 is slidable within the sleeve 12 and adapted to reach the inside of the drum wall 14a and engage in recesses 17 provided in the same, so that a rigid connection between the wheel body 2 and the driving gear wheel 14 can be established. Each locking member 16 has an inclined flank 16a on its rearward end in direction of rotation and the rear of each recess 17 is correspondingly inclined at 17a.

It will be obvious from the foregoing that on the engine shaft and the wheel body coupled thereto being rotated, the balls 8 will be moved radially outwards by centrifugal force, the said balls being moved out further, the greater the number of revolutions of the wheel body. The centrifugal force of the balls acts first against the compression springs 9 and the latter through the rings 11 on the sleeves 12, which will then press against the clutch lining 13. Each segment of the lining 13 is pressed at each end by the flange 12a of a sleeve 12 against the inside of the drum wall 14a taking with the wheel body 2 by friction the driving gear wheel 14. The springs 9 are compressed in proportion to the increase of the centrifugal force of the balls 8, which on their outward movement project the stems 15 of the locking member 16, so that finally the latter will reach and engage in the recesses 17 in the drum wall 14a, so that a rigid connection between the wheel body 2 and the driving gear wheel 14 is definitely established. An automatic clutch is thus provided which in the first place acting as a friction coupling starts the driving gear wheel and which on increasing speed of revolution provides a rigid driving means. When the speed of revolutions drops, the stressing of the springs 9 is released by the decrease in the centrifugal force of the balls 8 and the locking members 16 will be withdrawn by the springs into the spokes of the wheel body 2. The driving gear wheel can then rotate freely without any substantial friction. The automatic clutch at the same time constitutes a free wheel arrangement. If, for instance the forward travelling force of the vehicle is greater than the driving force of the engine, or which is the same, the speed of the driving gear wheel is greater than that of the wheel body, the driving gear wheel, the recesses 17 of which have inclined flanks 17a will slide over the corresponding flanks 16a of the locking member 16 and the vehicle will not be retarded by the engine.

On the driving gear wheel 14 are provided on the opposite side of the shaft 14b separate rings of teeth 24, 25 and 26, the ring 24 being in the form of a central pinion. The number of the rings may be greater or smaller. The rings of teeth mentioned above mesh with bevel wheels 27, 28, 29 and 30 journalled on a hollow transmission shaft 31, which extends transversely to the driving shafts 2a and 14a. The ends of the hollow shaft 31 are supported in roller bearings 44 and 45 mounted in the side walls of the casing 60. The wheels 27, 28 and 29 rotate in the same direction and effect the forward motion of the vehicle, while the wheel 30 operates in the opposite direction for producing the reverse motion. The pinion 24 meshes on opposite sides with the wheels 29 and 30 and thus produces both directions of rotation. Besides, the four bevel wheels referred to, two spur wheels 32 and 33 are mounted on the same transmission shaft 31 both on one side between the bevel wheel 30 and the bearing 45 of the shaft. All six gear wheels on the shaft 31 are rotatably mounted with bushes 34 and are provided with lateral sliding rings 35 for taking up axial pressure, which are loosely rotatable on the bushes 34.

In one plane with the transmission shaft 31 a driving casing 105 of a differential is arranged, on which spur wheels 36 and 37 are fixed meshing with the gear wheels 32 and 33 on shaft 31. The casing 105 of the differential possesses lateral hollow extensions 106 and 107 lying parallel to shaft 31 and mounted with their free ends in ball bearings 108 and 109 in the side walls of the housing 60. The hollow extensions 106 and 107 enclose differential shafts 111 and 112 forming the driven shafts. The differential shafts 111 and 112 are freely rotatable in bushings 110 of the extensions. At their inner ends are fixed in known manner bevel gears 113, 114 meshing with a set of bevel gears 115 journalled on stubs 116 fixed in the differential housing 105. The outer free ends of the differential shafts 111 and 112 extend outwardly through the side walls of the housing 60 and are in connection with the driving wheels of the vehicle. All toothed wheels may be provided with silent teeth, for instance helical teeth, as they are all in constant mesh.

Between each two gear wheels 27, 28; 29, 30; and 36, 37; respectively there are keyed by means of keys 39 to the shaft 31 bodies 38 of driving couplings (Figure 2—Figure 4) each body 38 consisting of a hollow ring with outwardly extending pairs of radial lugs 42 in which claws 40 extending to opposite sides are pivoted by means of pins 41. The pivotally mounted claws 40 are recessed in their outer edges in which enclosing spring rings 43 engage, seeking to retract the claws 40 inwards. The free ends of the claws 40 are adapted to engage with recesses 40a provided in the projecting lugs of the adjacently arranged gear wheels. The lateral engaging surfaces or flanks $d^1$ and $d^2$ of the claws 40 (Figure 3) are of different shape. The flank $d^1$ is radial to the centre and transmits the driving force entirely radially. The oppositely disposed flank $d^2$ is inclined somewhat tangentially. This arrangement provides the advantage that on the claws being forced upwards, that is put out of operation by means to be explained later on, during which the driver each time throttles the engine and therefore the propulsive power of the vehicle always acts against the flanks $d^2$, the claws can be actuated very readily. All that is necessary is for the spring tension of the spring rings 43 to be overcome and the claws can never get stuck in the recesses 40a of the toothed wheels. In the case of the claws for the reversed speeds the operation is the same in the opposite direction.

Between each pair of lugs 42 guiding holes 38a extend through the ring 38 communicating with corresponding bores 38b in the transmission shaft 31. In these guiding holes 38a, 38b plungers 49 are slidably mounted, bearing with outer conical ends against the inner edges of the claws 40. With their inner ends the plungers 49 rest on selector balls 48 which are also mounted in the guiding holes and are operated by controlling means as will be explained later on. In the present arrangement each driving coupling has twice three, that is to say six plungers 49 and six selector balls 48, but any greater or smaller number may be used. Six guiding holes are in each case bored in alignment with one another, so that there are altogether three sets each in alignment. The different alignments or sets are at an angle of 120° to one another.

In the bore of the transmission shaft 31 a control shaft 46 for operating the claws 40 of the driving couplings is mounted. The shaft 46 is provided at predetermined distances of its length with recesses 47 for the selector balls 48. The control shaft 46 is axially movable into different positions in which definite recesses 47 communicate with the guiding holes 38a, 38b of corresponding couplings, so that their selector balls can enter, whereby the claws 40 become engaged with the adjacent gear wheels and connect corresponding gear trains for obtaining different speed ratios. The depth of the recesses 47 is greater by a certain amount $a$ than the radius of the balls 48, whereby a lateral displacement of the shaft 46 from one speed to another is prevented (Fig. 8).

Figure 7:
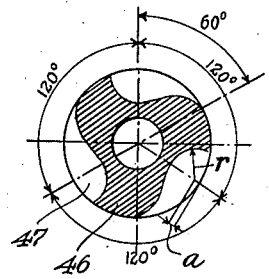
Figure 7 is a cross section through a portion of the control shaft.

The control shaft 46 is adapted to be turned through one-sixth of a revolution, so that all selector balls 48 are out of engagement with the recesses 47 and consequently all gear wheels on the transmission shaft 31 are uncoupled, whereby the control shaft can be returned to the neutral position from any particular operative position without interfering with other speeds. A rotary motion of the control shaft is made possible through the recesses 47 being distributed exactly in three alignments at a distance of 120° from one another on the periphery of the shaft, the recesses following the form of a cycloid up to a sixth of a revolution, that is, over a distance of 60° (Figure 7). On the shaft 46 being turned, all the selector balls 48 will easily leave their recesses 47 without experiencing any great resistance. The control shaft 46 is hollow and in it is placed a control bar 50 which is axially displaceable to a limited extent. The control bar possesses on its middle part two lugs 51 which extend through helical guide openings 70 in the control shaft 46 (Figure 6) and slide in a V-shaped groove 52 in the inner wall of the shaft 31. This arrangement ensures, that the control shaft always turns with the transmission shaft in the same direction and at the same speed. Rotary motion of the control shaft 46 with respect to the transmission shaft 31 can be produced by pulling out the bar 50 which is guided with its lugs 51 in the helical guides 70 so that by axial movement of the lugs 51 along the inclined faces of the guides 70 the shaft 46 is turned with respect to the transmission shaft 31 and to the control bar 50 up to a sixth of a revolution.

The gear wheels on the shaft 31 are operated by the driving couplings in the following manner in order to obtain different ratios of transmission between the driving shaft of the engine and the driven differential shafts. For each gear change the control bar 50 is at first axially displaced by means which will be fully explained later on, whereby the lugs 51 sliding in the oblique guide holes 70 will act to turn the control shaft 46 into neutral position, so that it can be axially moved within the shaft 31 into the position corresponding to the desired combination of the gear trains. Afterwards the control bar 50 will be returned, whereby the control shaft 46 is turned back, so that the corresponding selector balls 48 can snap into the recesses 47 under the spring tension of the ring 43, which draws the respective claws 40 of the driving couplings towards the projecting hub of the particular adjacent gear wheel, in which the recesses 40a are milled so as exactly to fit the claws at a distance from another of 120° and the claws will snap into the recesses 40a. Consequently when effecting engagement, it is never necessary to wait until a claw is in position over a recess and it is always possible without any resistance to slide the control shaft 46 into the the desired position. When in the engaged position, the spring rings 43 rest in the recesses 43a provided in the lugs 42 while in the disengaged position they are held in the recesses of the claws 40. The spring rings can thus never become displaced laterally out of position.

The present arrangement has for example six forward speeds and two reverse speeds. Owing to the fact that the change speed gear is connected to the differential gear it is possible to obtain with relatively few toothed wheels a great number of different speeds. In Figure 1 the second forward speed is shown in engagement, namely, the bevel wheel 29 and the spur wheel 32. On the control shaft being displaced, two sets of selector balls of the two desired gear wheels will always snap into recesses 47, which each time results in another speed. Thus, the simultaneous putting into operation of the two wheels 29 and 33 produces the first forward speed, the wheels 29 and 32 the second, the wheels 28 and 33 the third, the wheels 27 and 33 the fourth, the wheels 28 and 32 the fifth and the wheels 27 and 32 the sixth forward speed. Putting the wheels 30 and 33 into operation is the first reverse and the wheels 30 and 32 the second reverse speed. When a further pair of spur wheels with a different transmission ratio is used and in conjunction with the differential three forward speeds and one further reverse speed are obtained. The combining of these two gears, the change speed and the differential gear, therefore provides the great advantage that without any great expenditure of material a very great number of possible speeds is obtained. This arrangement provides the further advantage that, not taking the friction into account none of the efficiency is lost. All the bevel wheels which are in mesh with the driving gear wheel 14 have a step down ratio. The wheel 27 has the ratio 1:1, thus going to the limit. The pairs of spur wheels 32, 36; and 33, 37; respectively are also both stepped down. It can therefore never occur that any speed works with a bad ratio of transmission. The arrangement of the driving gear wheel also provides the possibility for a great range of step down ratios. For instance the first forward and reverse speed has a total step down ratio of 24:1. The sixth speed on the other hand has a ratio 2:1. This corresponds approximately with the first speed to a travelling speed of the vehicle of 12 klm. per hour and with the sixth speed to 150 klm. per hour. The good grading provides the possibility of utilizing the vehicle economically at all loads which are likely to occur and for all rod gradients. The great step down of the first speed makes possible a good start without a jolt with automatic clutch already described.

For its longitudinal displacement the control shaft 46 is provided at one end with a spindle 53. The spindle 53 is in the form of a tube of preferably the same outer diameter as the shaft 46 and is fixed to the end of the shaft extending beyond the transmission shaft 31. The spindle 53 is held on the control shaft by a ring 54 which prevents lateral displacement and is rigidly fixed to the control shaft 46. On its outer face the spindle 53 has one or more threads, engaging with corresponding inner threads of a nut 55 mounted on the spindle. The nut 55 is constructed as a toothed pinion and is bordered on one side by the closure cap 56 of the bearing 44 and on the other side by an inwardly projecting flange of a sleeve 57. The sleeve 57 is in the form of a cap covering the end of the spindle 55 which projects from the side wall of the casing 60. The cap is journalled near its open reinforced end in a bearing bracket 58 which is fixed by a flange to the side wall of the casing 60. In order to prevent lateral motion of the sleeve 57 at the outer side of the bracket 58 an adjusting ring 61 is fixed to the sleeve. The sleeve 57 has inwardly longitudinal slots 59 which engage with projections 83 extending from the outer circumference of a sleeve 82 which is slidably mounted in the cap and adapted to rotate with same. The sliding sleeve 82 has at its inner cylindrical face a single or multiple thread which engages in a threaded bush 84. The threaded bush 84 is mounted and simultaneously limited on one end by a terminal member 85 which is rigidly connected to the one end of the control bar 50 projecting from the control shaft 46. On its opposite end the bush 84 is lying against an inwardly projecting flange of the enclosing sleeve 82.

On the rotary sleeve 57 turning and with it the sliding sleeve 82, the threaded bush 84 in the latter sleeve operates to draw out the bar 50. In consequence the gear shaft 46 is turned into the neutral position and ready for axial displacement. The opposite end of the control bar 50 extending beyond the control shaft is surrounded by a helical spring 86, the one end of which contacts with an enlarged head of the bar 50, while the other end contacts with the control shaft 46. On release of the operating mechanism the spring 86 acts to draw back the bar 50 into the original position.

The shifting mechanisms referred to above of the control shaft 46 and of the control bar 50 are connected with a common gear lever 66 in the following manner. On the top of the casing 60 bearings 67 and 68 are provided in which a gear lever shaft 63 is journalled. On the one end of the shaft 63 the hub of a toothed segment 62 is fixed by means of a key 64. The segment 62 engages with the toothed pinion 55 on the spindle 53 of the control bar 46. An adjusting ring 69 is mounted on the other end of the gear lever shaft 63 adjacent the bearing 67 and prevents longitudinal displacement in combination with the hub of the segment 62. At the opposite end of the segment 62 the shaft 63 is slotted and within the slot the gear lever 66 is pivotally mounted by a pivot pin 65. The gear lever 66 therefore can be turned in two planes lying under an angle of 90°.

The gear lever shaft 63 is partly hollow and within its bore a push bar 74 is slidably mounted, which possesses on its inner end a transverse driving pin 75, extending through longitudinal slots 76 of the shaft 63. The ends of the driving pin 75 project on opposite sides from the periphery of the shaft 63 and reach into an inner circular groove of a sliding collar 73 which is axially displaceable on the shaft 63. The sliding collar 76 is normally urged against the bearing 67 by a helical spring 87 which surrounds the shaft 66. The one end of the spring 87 contacts with the bearing 68 while the other end engages the sliding collar 73. The longitudinal dimension of the circular groove 90 in the collar 73 is greater than the size of the driving pin, so that the collar 73 can be axially moved a certain distance without operating the pin. On its outer periphery the sliding collar 73 possesses a circular groove 90a, which engages with the one end of a push bar 71, the opposite end of which is connected by means of a joint 72 to the gear lever 66 at some distance from its pivoting point 65. At the outwardly projecting end of the push bar 74 a lever 74a is fixed, the free end of which is pivotally connected by means of a bolt 78 to the one limb 77 of a bell crank lever. The bell crank lever is mounted so as to pivot with its middle part about a pin 79 of the bracket 58. The other limb 80 of the bell crank has a slot near its end and engages with a pin 81, which is fixed to the adjusting ring 61.

On the gear lever 66 being swung laterally about the pin 65 the movement is transmitted by the push bar 71 to the sliding collar 73, which is axially displaced on the shaft 63 against the action of the spring 87. The driving pin 75 is carried along by the sliding collar 73 when the latter is displaced and thereby causes the push bar 74 to move out of the gear lever shaft 63. On the push bar 74 being forced outwards, the ring 61 and the rotary sleeve 57 connected to it will be turned through the motion transmitted by the bell crank lever. This also causes the sliding sleeve 82 to turn as well and on turning of same the threaded bush 84 and with it the bar 50 is drawn out and thereby the gear shaft 46 turned into its neutral position, so that each desired speed can be selected by axial displacement of the shaft 46. On the gear lever 66 being released the compression spring 86 on the bar 50 and the compression spring 87 on the lever shaft 63 bring all the transmission shifting elements back into the original position.

On the gear level 66 being swung forwards and backwards, the gear lever shaft 63 is put in rotation and imparts through the toothed segment 62 to the toothed pinion 55 a left-handed or right-handed rotary motion, thereby displacing the control shaft 46 to or fro by means of the spindle 53 so that it can be put into the desired position.

On the top of the casing 60 a segment shaped bracket 89 is mounted, serving as a guide for the gear lever 66. The upper part of the bracket 89 forms a substantially rectangular frame and in the one side of the longitudinal frame member, along which the lever 66 is sliding when being turned forwards or backwards rests 88 are provided in which a lateral extension of the lever 66 is adapted to engage. At the one end of the side face of the longitudinal member a stop 91 is provided and a gate 92 is formed in the transverse bar 100 of the frame adjacent the stop 91. In the lower edge of the bar 100 a recess 101 is provided (Figure 9). The frame is divided on its length into two gates 93 and 95 by an inwardly directed extension 89a. The gear lever is partly hollow and in its bore a rod 98 is slidably mounted, the upper end of which extends beyond the gear lever and can be depressed by hand. Between the inner end of the rod 98 and the bottom of the bore in the gear lever 66 a compression spring 102 is inserted. At the inner end the rod 98 possesses a lug 99 which projects through a slot in the lever 66 and is adapted to engage in the recess 101 in the corresponding position of the lever 66.

In Figure 10 the rests 88 for the different speeds are indicated by Roman numerals. R is the reverse speed. When sliding over the rests, the control lever is kept pressed by the spring 87 against the side of the segment bracket 89. The small lateral displacement which the control lever experiences during this motion is taken up by the sliding collar 73 in its internal groove 90, without the driving pin 75 being moved. The motion to and fro of the gear lever from position O to position VI thus follows a straight line (Figure 11). At the limit of the O position is the stop 91 which prevents the reverse being thrown in without a check. Hence, the reverse can only be put in operation when the gear lever after reaching the O position, is swung a small distance sideways. The lateral swing of the lever does not however require any greater motion than that of the rests and that allowed by the groove 90 of the collar 73. Thus the reverse is only operated, when the gear lever is in the gate 92 of the bracket 89. In the gate 93 the gear lever can always be swung sideways and, when in the dotted position 94, can be pushed to and fro. Hence, the gear lever can be brought into the O position at any time. The gate 95 enables the vehicle to be blocked on account of freewheeling when parked. If, at the beginning of the gate, the gear lever be swung sideways into a position corresponding to that shown at 94, two dotted recesses 96 of the gear shaft 46 (Figure 1) will come under the selector balls 48 of the two spur wheels 32 and 33, causing these two wheels to be put in operation simultaneously. Since these wheels have different speeds of revolution the vehicle is blocked both for running forwards and backwards. This position of the gear lever can, however, only be reached, when the downwardly movable rod 98 has been depressed and with it the lug 99. This lug 99 prevents the gear lever from being swung laterally in the gate 95. Only on it being pressed downwards does it slide on the track 100 (Figure 9) and at the end of the swinging motion snap into the gap 101. The compression spring 102 provides the counter pressure for the rod.

I claim:—

1. In a change speed gear, a common transmission shaft, two sets of loose gears thereon, said transmission shaft having a series of apertures opposite the gear wheels thereon, clutch elements on the transmission shaft movable thereon into and out of operative engagement with the gear wheels on the transmission shaft for independently locking each of said gear wheels to the transmission shaft, balls in said apertures capable of radial displacement therein and in operative engagement with the clutch members, and a common control member in the transmission shaft for said clutch elements, said control member capable of turning for simultaneously moving the clutch elements of any gear of both sets into and out of operative engagement and also of free axial displacement in the transmission shaft for locating it in the required positions to operate the respective clutch elements on being turned and having recesses therein located so as to come successively opposite the said balls on the control member being axially displaced and turned in the transmission shaft, said recesses adapted to receive the said balls and being deeper than the radius of the balls so as to prevent axial displacement of the control member when any one ball is in a recess.

2. In a change speed gear having a hollow transmission shaft with a plurality of gear wheels loosely rotatable thereon, the combination of clutch elements on the transmission shaft movable thereon into and out of operative engagement with the gear wheels on the transmission shaft for independently locking each of said gear wheels to the transmission shaft, a hollow control member in the transmission shaft for said clutch elements, said control member capable of turning for moving the individual clutch elements into and out of operative engagement and also of axial displacement in the transmission shaft for locating it in the required positions to operate the respective clutch elements on being turned, said hollow control member having oblique guide slots therein, a control bar inside said control member and slidable axially therein, the transmission shaft having an internal axial groove therein and the control bar having catches thereon extending through the guide slots on the control member into the groove in the transmission shaft, so that on the control bar being axially displaced in the control member the latter is turned to operate the respective clutch element.

3. In a change speed gear having on a common transmission shaft two sets of loose gears thereon, and clutch elements on the transmission shaft movable thereon into and out of operative engagement with the gear wheels on the transmission shaft for independently locking each of said gear wheels to the transmission shaft, a common control member in the transmission shaft for said clutch elements, said control member capable of turning for simultaneously moving the clutch elements of any gear of both sets into and out of operative engagement and also of free axial displacement in the transmission shaft for locating it in the required positions to operate the respective clutch elements on being turned.

4. In a change speed gear as set forth in claim 3, in which the clutch elements are radially displaceable and the control member has recesses located therein so as to operate the clutch elements in pairs on the control member being axially displaced and turned in the transmission shaft, said clutch elements having actuating means adapted to move into and out of said recesses for operating the clutch elements.

FRITZ KREIS.